United States Patent
Parks et al.

(10) Patent No.: US 10,606,648 B2
(45) Date of Patent: *Mar. 31, 2020

(54) PREVENTION AND RESOLUTION OF A CRITICAL SHORTAGE OF A SHARED RESOURCE IN A MULTI-IMAGE OPERATING SYSTEM ENVIRONMENT

(71) Applicant: INTERNATIONAL BUSINESS MACHINES CORPORATION, Armonk, NY (US)

(72) Inventors: Lorne Parks, Markham (CA); Alexei Pytel, Rochester, MN (US); Steven Simonson, Rochester, MN (US); Bruce Talbott, Rochester, MN (US); Thomas Wasik, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 139 days.

This patent is subject to a terminal disclaimer.

(21) Appl. No.: 15/806,831

(22) Filed: Nov. 8, 2017

(65) Prior Publication Data
US 2019/0065269 A1 Feb. 28, 2019

Related U.S. Application Data

(63) Continuation of application No. 15/687,821, filed on Aug. 28, 2017.

(51) Int. Cl.
*G06F 9/50* (2006.01)
*H04L 12/911* (2013.01)
(Continued)

(52) U.S. Cl.
CPC ........ *G06F 9/5022* (2013.01); *G06F 12/0261* (2013.01); *G06F 16/22* (2019.01);
(Continued)

(58) Field of Classification Search
CPC .......................... G06F 9/5022; G06F 9/45558
See application file for complete search history.

(56) References Cited

U.S. PATENT DOCUMENTS 7,249,179 B1 * 7/2007 Romero ................ G06F 9/5083
709/221
8,442,960 B1 * 5/2013 Meyer ..................... H04L 67/14
707/694

(Continued)

OTHER PUBLICATIONS

Lorne Parks et al.,"Prevention and Resolution of a Critical Shortage of a Shared Resource in a Multi-Image Operating System Environment", Related Application, U.S. Appl. No. 15/687,821, filed Aug. 28, 2017.

(Continued)

*Primary Examiner* — Benjamin C Wu
(74) *Attorney, Agent, or Firm* — Cantor Colburn LLP; William Kinnaman

(57) ABSTRACT

A technique relates to resource allocation of a countable managed resource. A computer sets a reserved amount of the managed resource to be available for a privileged status, such that there is an unreserved amount of the managed resource to be available for a non-privileged status. In response to a non-privileged job needing more of the unreserved amount of the managed resource than what is available, it is determined whether the non-privileged job is promotable to the privileged status. In response to the non-privileged job not being promotable to the privileged status, the non-privileged job is prevented from accessing the reserved amount of the managed resource. In response to the non-privileged job being promotable to the privileged status, the non-privileged job is permitted to utilize the reserved amount of the managed resource.

7 Claims, 11 Drawing Sheets

(51) Int. Cl.
  *G06F 12/02* (2006.01)
  *G06F 16/22* (2019.01)
  G06F 9/455 (2018.01)
  H04L 29/08 (2006.01)
  H04L 12/26 (2006.01)
(52) U.S. Cl.
  CPC ...... *H04L 47/70* (2013.01); *G06F 2009/4557* (2013.01); *H04L 43/0888* (2013.01); *H04L 67/2885* (2013.01)

(56) References Cited

U.S. PATENT DOCUMENTS

| | | | |
|---|---|---|---|
| 9,280,392 B1* | 3/2016 | Boss | G06F 9/5011 |
| 9,397,900 B2 | 7/2016 | Cheng | |
| 9,491,112 B1 | 11/2016 | Patel et al. | |
| 9,507,638 B2 | 11/2016 | Cuadra et al. | |
| 9,513,951 B2 | 12/2016 | Arges et al. | |
| 9,531,616 B2 | 12/2016 | Yang | |
| 9,569,356 B1 | 2/2017 | Wei et al. | |
| 2002/0053011 A1* | 5/2002 | Aiken | G06F 9/5016 |
| | | | 711/170 |
| 2003/0115476 A1* | 6/2003 | McKee | G06F 9/52 |
| | | | 713/193 |
| 2008/0034370 A1* | 2/2008 | Huizenga | G06F 9/5011 |
| | | | 718/104 |
| 2011/0185364 A1* | 7/2011 | Fernandes | G06F 9/5083 |
| | | | 718/104 |
| 2012/0159502 A1 | 6/2012 | Levin et al. | |
| 2012/0204186 A1* | 8/2012 | Davidson, II | G06F 9/4881 |
| | | | 718/104 |
| 2012/0216210 A1 | 8/2012 | Armstrong et al. | |
| 2012/0272247 A1* | 10/2012 | Scott | G06F 9/4881 |
| | | | 718/108 |
| 2013/0346707 A1 | 12/2013 | Voznika et al. | |
| 2016/0170800 A1* | 6/2016 | Di Balsamo | G06F 9/4887 |
| | | | 718/104 |
| 2017/0031698 A1 | 2/2017 | Mathews et al. | |
| 2017/0041498 A1 | 2/2017 | Kamasuka | |
| 2017/0149786 A1* | 5/2017 | Alon | H04L 63/104 |
| 2017/0235606 A1* | 8/2017 | Cherniavsky | G06F 9/5011 |
| | | | 718/104 |

OTHER PUBLICATIONS

List of IBM Patents or Patent Applications Treated as Related; (Appendix P), Filed Nov. 8, 2017; pp. 1-2.

Griffeth et al., "Scalability of a Distributed Real-Time Resource Counter," ResearchGate, Jun. 1998, pp. 1-10.

Lang, "Resource-bounded Reachability on Pushdown Systems," Master Thesis, Matrikelnummer: 272387, Sep. 22, 2011, pp. 1-130.

Nguyen et al., "Technical Solutions to Resources Allocation for Distributed Virtual Machine Systems," (IJCSIS) International Journal of Computer Science and Information Security, vol. 13, No. 2, Feb. 2015, pp. 1-6.

* cited by examiner

FIG. 6

PRIVOBJ MEMBER FUNCTIONS 602

* CREATE_PRIVOBJ
* RETURN_PRIVILEGED_FREE
* RETURN_NON_PRIVILEGED_FREE
* INCREMENT_PRIVILEGED_FREE_COUNT (PRIVFREE) BY SUPPLIED VALUE.
* DECREMENT_PRIVILEGED_FREE
* RETURN_RESOURCE_PROMOTABLE
* RESET_RESOURCE(S)
* OFF_PRIVOBJ

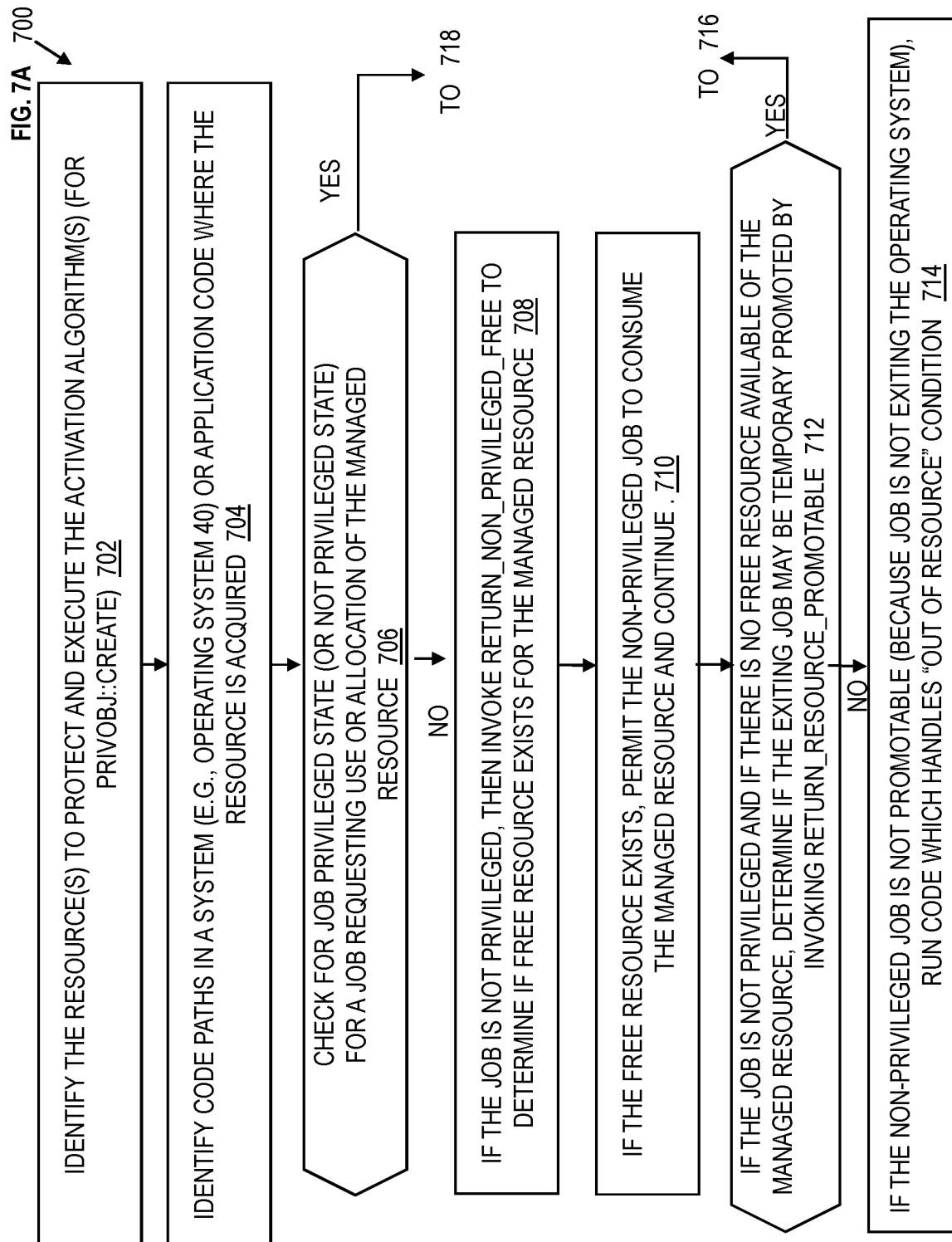

FIG. 7B 700

IF DETERMINED THAT NON-PRIVILEGED JOB IS PROMOTABLE TO PRIVILEGED STATUS BECAUSE THE JOB IS EXITING THE OPERATING SYSTEM/MANAGED RESOURCE, PROMOTE THE JOB AND SUPPLY THE JOB WITH THE REQUESTED RESOURCE NEEDED TO EXIT 716

↓

IF THE JOB IS PRIVILEGED THEN INVOKE RETURN_PRIVILEGED_FREE TO DETERMINE THE VALUE OF THE RESERVED RESOURCE THAT IS ACTUALLY FREE, AND THIS VALUE IS PRIVFREE IN THE TABLE 718

↓

IF THE VALUE OF THE AVAILABLE RESERVED RESOURCE (PRIVFREE) IS GREATER THAN OR EQUAL TO THE AMOUNT REQUESTED BY THE PRIVILEGED JOB, SUPPLY THE REQUESTED AMOUNT OF THE RESERVED RESOURCE TO THE PRIVILEGED RESOURCE (I.E., ALLOCATE THE RESOURCE TO THE JOB) 720

↓

IF NO PRIVILEGED/RESERVED RESOURCE IS AVAILABLE, THEN RUN CODE WHICH HANDLES "OUT OF RESOURCE" CONDITION 722

↓

IDENTIFY CODE PATHS IN A SYSTEM OR APPLICATION CODE WHERE THE RESOURCE (PREVIOUSLY USED BY A JOB (PRIVILEGED OR NON-PRIVILEGED) IS RETURNED AND TO INVOKE INCREMENT_PRIVILEGED_FREE_COUNT (I.E., INCREMENT PRIVFREE) FOR THE RESOURCE BEING RETURNED REGARDLESS OF THE JOB'S PRIVILEGED STATUS 724

FIG. 7C ⟵ 700

IDENTIFY AND/OR MONITOR CODE PATHS WHERE THE RESOURCE COUNTERS ARE INCREASED AND/OR DECREASED; WHERE AN INCREASE OR DECREASE OF RESOURCE COUNTERS OF THE MANAGED RESOURCE TYPICALLY OCCURS BECAUSE OF A CONFIGURATION CHANGE 726

IF THE JOB IS PRIVILEGED THEN INVOKE RETURN_PRIVILEGED_FREE TO DETERMINE THE VALUE OF THE RESERVED RESOURCE THAT IS ACTUALLY FREE, AND THIS VALUE IS PRIVFREE IN THE TABLE 718

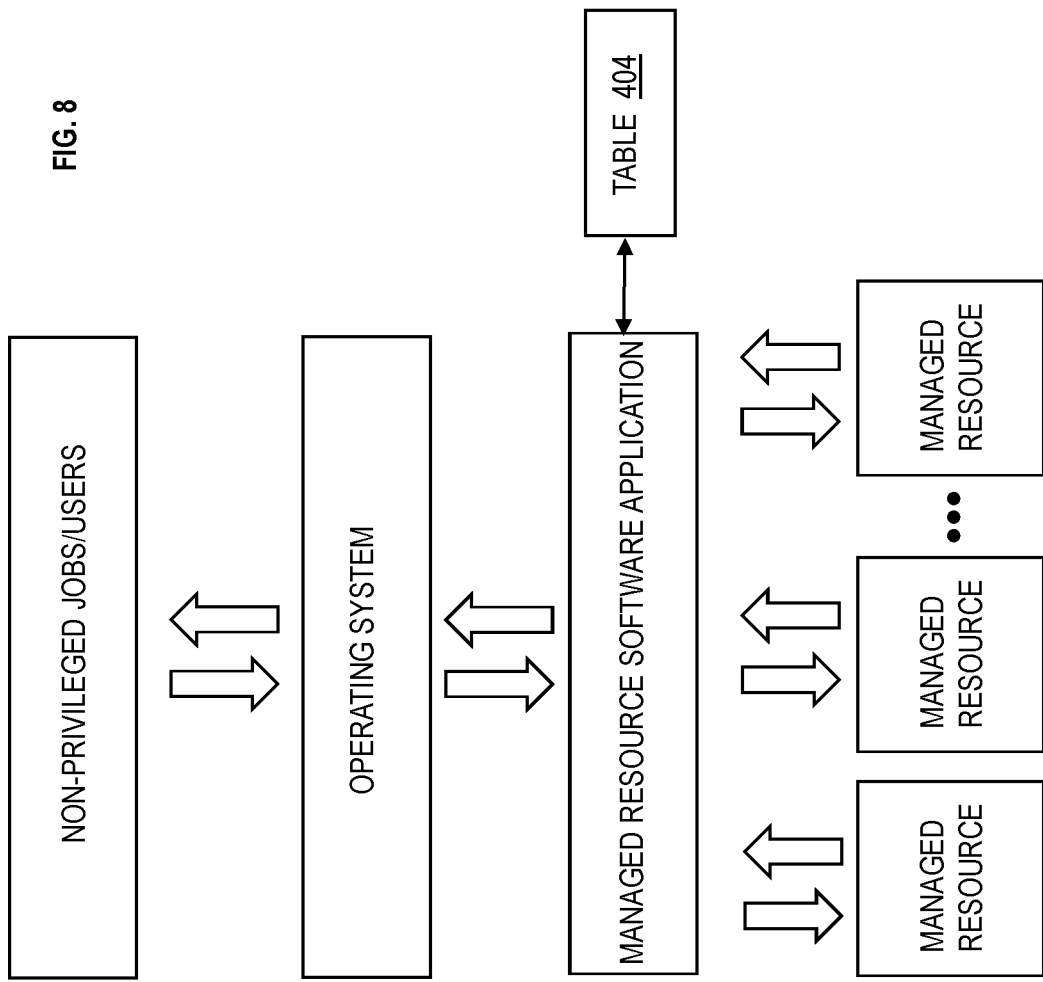

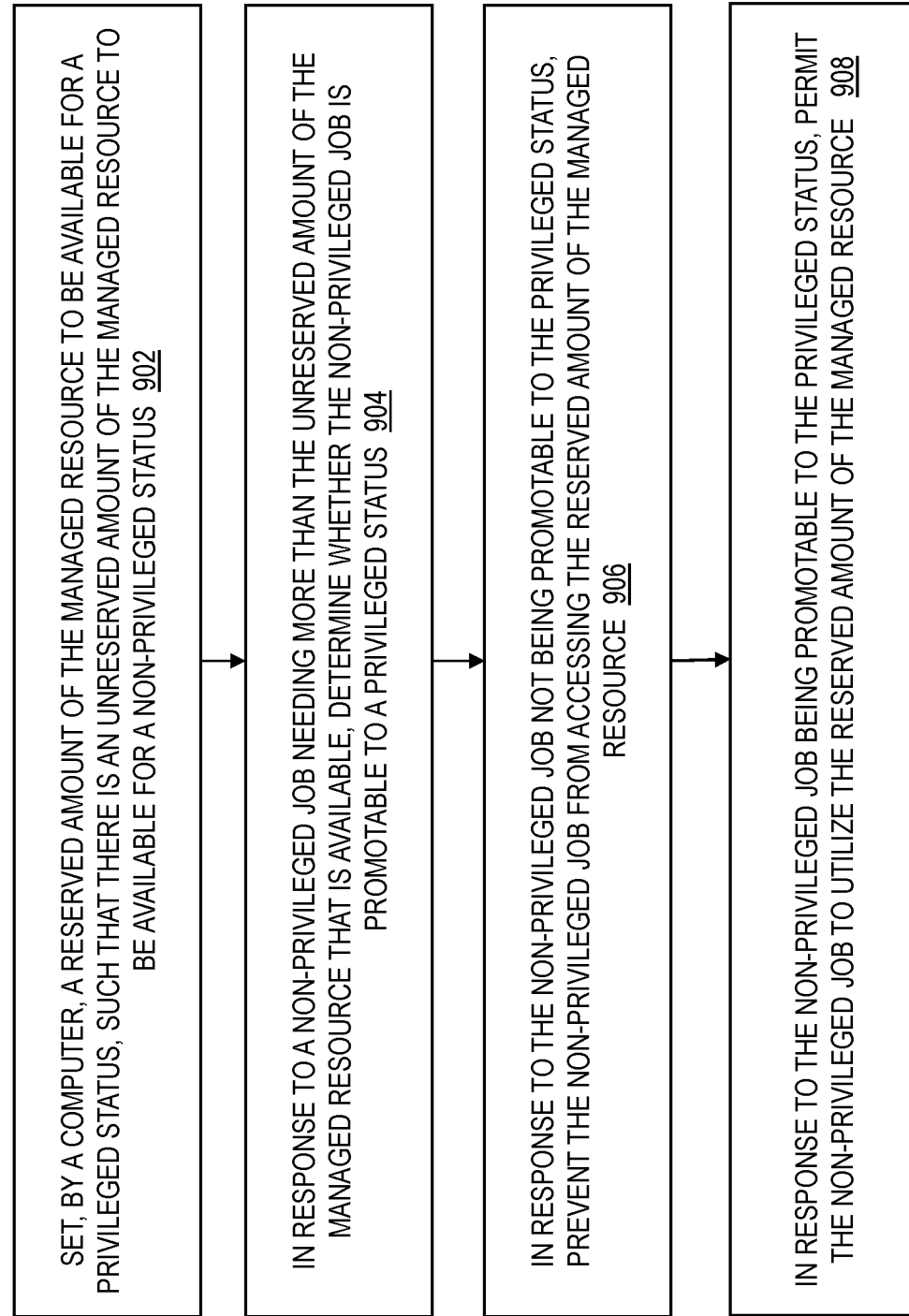

PREVENTION AND RESOLUTION OF A CRITICAL SHORTAGE OF A SHARED RESOURCE IN A MULTI-IMAGE OPERATING SYSTEM ENVIRONMENT

DOMESTIC PRIORITY

This application is a continuation of U.S. application Ser. No. 15/687,821, titled "PREVENTION AND RESOLUTION OF A CRITICAL SHORTAGE OF A SHARED RESOURCE IN A MULTI-IMAGE OPERATING SYSTEM ENVIRONMENT" filed Aug. 28, 2017, the contents of which are incorporated by reference herein in its entirety.

BACKGROUND

The present invention generally relates to computer systems, and more specifically, to prevention and resolution of a critical shortage of a shared resource in a multi-image operating system environment.

An operating system (OS) is system software that manages computer hardware and software resources and provides common services for computer programs. All computer programs, excluding firmware, require an operating system to function. Time-sharing operating systems schedule tasks/jobs for efficient use of the system and may also include accounting software for cost allocation of processor time, mass storage, printing, and other resources. For hardware functions such as input and output and memory allocation, the operating system acts as an intermediary between programs and the computer hardware, although the application code is usually executed directly by the hardware and frequently makes system calls to an operating system function or is interrupted by it. Operating systems are found on many devices that contain a computer, from cellular phones and video game consoles to web servers and supercomputers.

In computing, a shared resource, or network share, is a computer resource made available from one host to other hosts on a computer network. A shared resource is a device or piece of information on a computer that can be remotely accessed from another computer, typically via a local area network or an enterprise intranet, transparently as if it were a resource in the local machine. Network sharing is made possible by inter-process communication over the network. Some examples of shareable resources are computer programs, data, storage devices, and printers. The shared resource can be called a shared disk (also known as mounted disk), shared drive volume, shared folder, shared file, etc.

Cooperative memory management, used by many early operating systems, assumes that all programs make voluntary use of the kernel's memory manager, and do not exceed their allocated memory. This system of memory management is almost never seen anymore since programs often contain bugs which can cause them to exceed their allocated memory. If a program fails, it may cause memory used by one or more other programs to be affected or overwritten.

Memory protection enables the kernel to limit access of a process to the computer's memory. Various methods of memory protection exist, including memory segmentation and paging. All methods require some level of hardware support. In both segmentation and paging, certain protected mode registers specify to the central processing unit (CPU) what memory address it should allow a running program to access. Attempts to access other addresses trigger an interrupt which causes the CPU to re-enter supervisor mode, placing the kernel in charge. This is called a segmentation violation, and since it is both difficult to assign a meaningful result to such an operation, and because it is usually a sign of a misbehaving program, the kernel generally resorts to terminating the offending program and reports the error.

SUMMARY

Embodiments of the present invention are directed to a computer-implemented method for resource allocation of a typically countable (or, more generally, quantifiable) managed resource. A non-limiting example of the computer-implemented method includes setting, by a computer, a reserved amount of the managed resource to be available for a privileged status, such that there is an unreserved amount of the managed resource to be available for a non-privileged status, and in response to a non-privileged job needing more of the unreserved amount of the managed resource than what is available, determining whether the non-privileged job is promotable to the privileged status. The method includes in response to the non-privileged job not being promotable to the privileged status, preventing the non-privileged job from accessing the reserved amount of the managed resource, and in response to the non-privileged job being promotable to the privileged status, permitting the non-privileged job to utilize the reserved amount of the managed resource.

Embodiments of the present invention are directed to a system for resource allocation of a countable managed resource. A non-limiting example of the system includes processing circuit and a storage medium readable by the processing circuit and storing instructions that, when executed by the processing circuit, cause the processing circuitry to perform a method. The method includes setting, by the processing circuit, a reserved amount of the managed resource to be available for a privileged status, such that there is an unreserved amount of the managed resource to be available for a non-privileged status, and in response to a non-privileged job needing more of the unreserved amount of the managed resource than what is available, determining whether the non-privileged job is promotable to the privileged status. The method includes in response to the non-privileged job not being promotable to the privileged status, preventing the non-privileged job from accessing the reserved amount of the managed resource, and in response to the non-privileged job being promotable to the privileged status, permitting the non-privileged job to utilize the reserved amount of the managed resource.

Embodiments of the invention are directed to a computer program product for resource allocation of a countable managed resource, the computer program product comprising a computer readable storage medium having program instructions embodied therewith, where the computer readable storage medium is not a transitory signal per se. The program instructions are readable by a computer system to cause the computer system to perform a method. A non-limiting example of the method includes setting, by the computer, a reserved amount of the managed resource to be available for a privileged status, such that there is an unreserved amount of the managed resource to be available for a non-privileged status, and in response to a non-privileged job needing more of the unreserved amount of the managed resource than what is available, determining whether the non-privileged job is promotable to the privileged status. The method includes in response to the non-privileged job not being promotable to the privileged status, preventing the non-privileged job from accessing the reserved amount of the managed resource, and in response to the non-privileged job being promotable to the privileged status, permitting the non-privileged job to utilize the reserved amount of the managed resource.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts example functions of managed resource software application according to embodiments of the present invention;

FIGS. 7A, 7B, and 7C depict example operations to integrate a privileged resource protection mechanism according to embodiments of the present invention;

FIG. 8 depicts a high-level diagram of individually protecting various managed resources according to embodiments of the present invention; and FIG. 9 is a flow chart of a computer-implemented method for resource allocation of a managed resource according to embodiments of the present invention.

Figure 1:
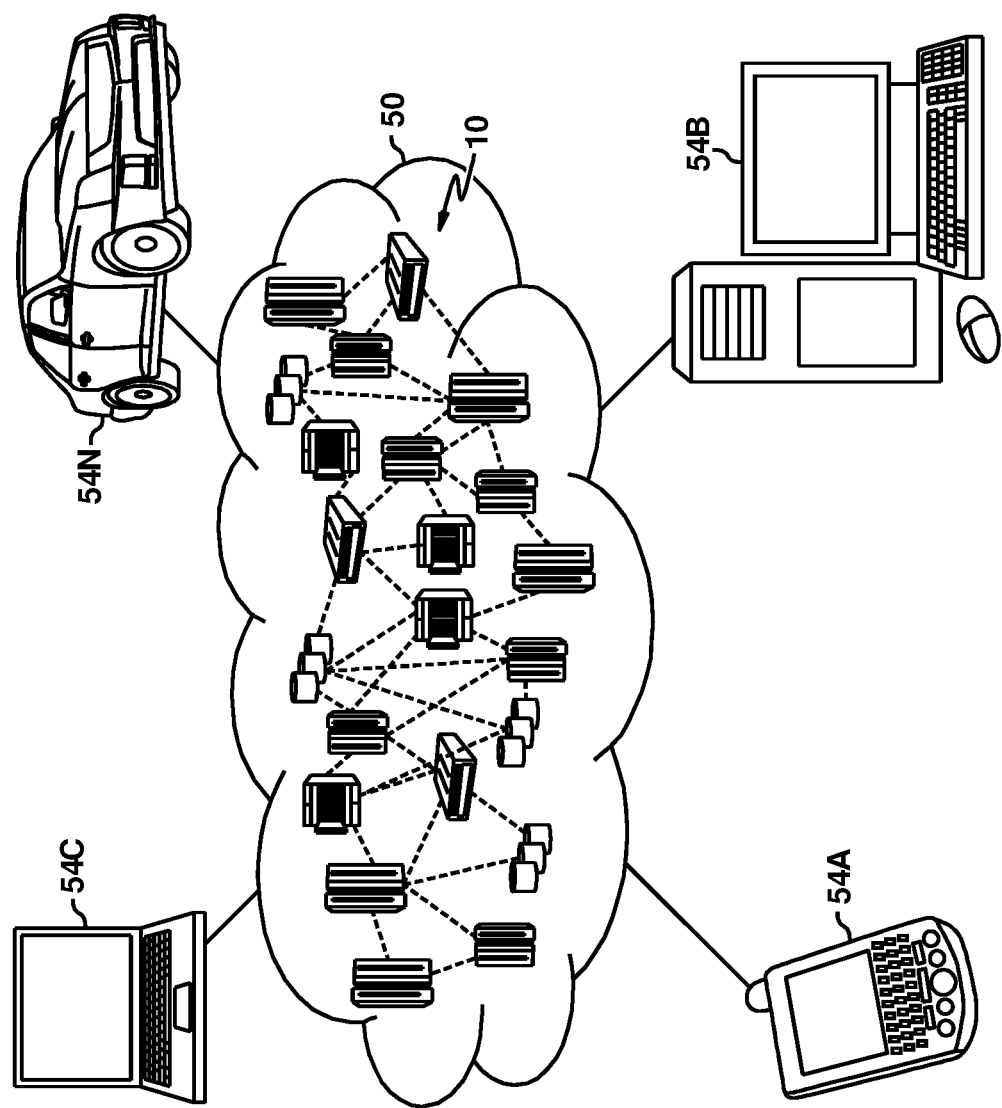
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number corresponds to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
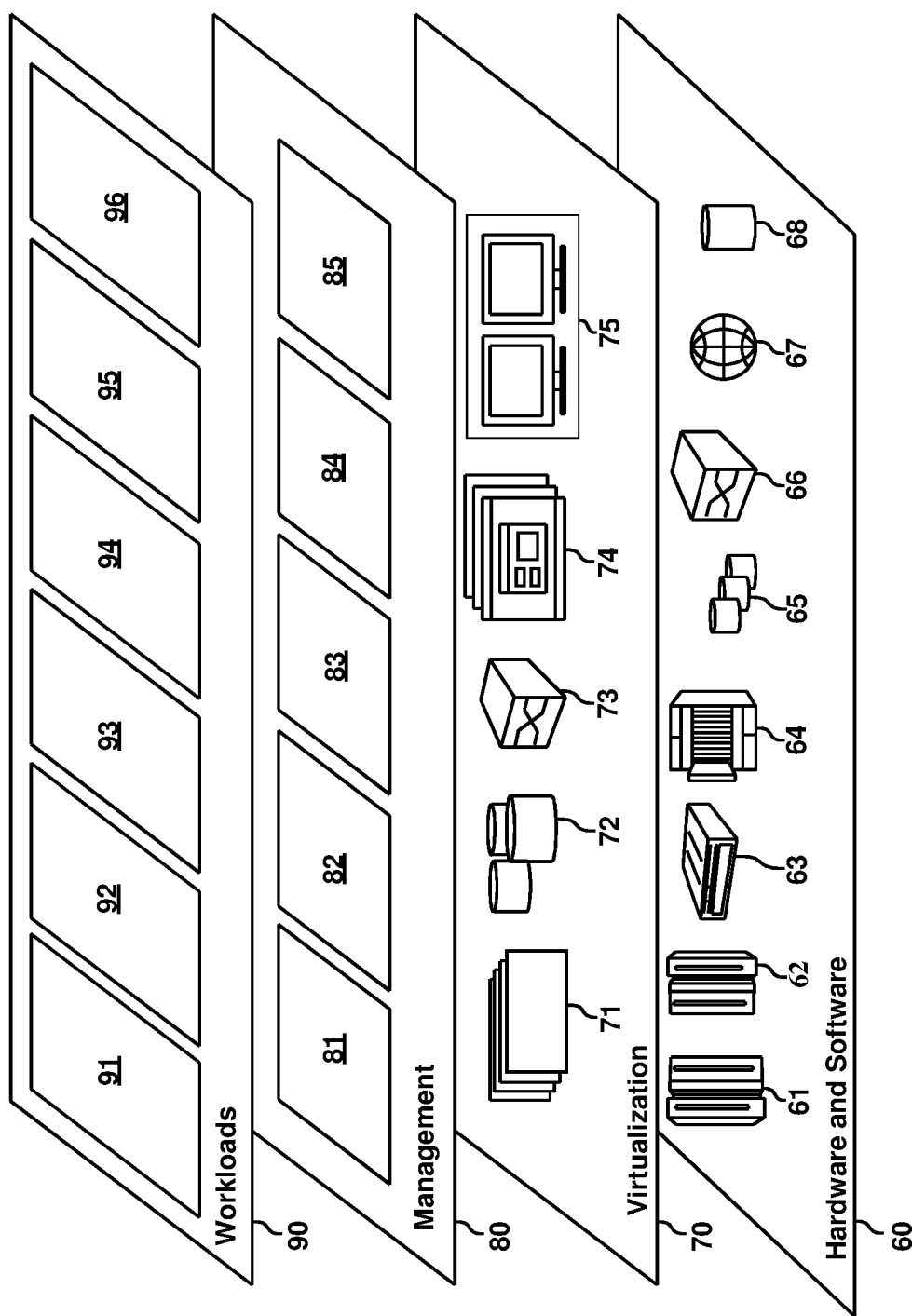
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software application 96.

Turning now to an overview of technologies that are more specifically relevant to aspects of the invention, an age old problem for operating systems is how to deal with a critical shortage of a resource. Examples of causes of a critical shortage include the application programming error that results in a loop consuming a resource, a runaway system task consuming and never freeing a resource, etc. Various analysis methods exist for identifying jobs using an excessive amount resource. After analysis, the misbehaving job(s) can be purged from the system thereby freeing up the needed resource. However, the process of analysis and cleanup may itself require some quantity of an already depleted resource. This potentially creates a deadlock situation.

It is now assumed that the resource in question is countable such that there is a defined number of entities that constitute a resource. For example, a countable resource (or quantifiable resource) can be a number of allocation blocks in a file system or a number of control structures which can be used. In order to allow resource shortage resolution, some amount of resource is reserved and is only available in an emergency for a special "privileged" type of users. The privileged user typically is given special security credentials to perform necessary cleanup tasks. Only privileged users can use the reserved resource. One method of reserving a part of the resource for privileged users involves marking or pooling. However, there are several problems with marking or pooling the resource. 1) Each resource is different and the process of marking or pooling will probably differ, so the resource management logic does not lend itself to generalization. 2) Having some parts of the resource marked "privileged" requires that all code dealing with the resource is cognizant of differences in behavior of "privileged" parts of the resource versus parts that are not privileged. This makes it difficult to locate and update all code paths when adding this logic. 3) Additional problems arise when different code levels (new code and legacy code) can coexist in a multisystem cluster that shares the resource. The code at each level must be able to handle resource marking or pooling. This creates change management challenges.

Turning now to an overview of the aspects of the invention, one or more embodiments of the invention address the above-described shortcomings of the prior art by providing a methodology of resource management that is designed to provide an environment for a guaranteed resolution of a resource shortage and address the disadvantages of other approaches. The approach can be used for any countable resource in both operating systems and applications.

An additional aspect of the invention addressed the shortcomings of the prior art by providing a mechanism to promote some non-privileged jobs to utilize reserved/privileged part of the resource. Once a privileged user determines the offending job(s), the offending jobs must be purged from the system. However, the process of purging a job may require some amount of the managed resource. The resource management logic is configured to recognize this scenario and temporarily promote such non-privileged job to the privileged status to allow the job to obtain the necessary amount of the resource thereby allowing the job to be purged and return the needed resource.

The managed resource is to be countable. However, the resource management logic is configured to tolerate scenarios when the resource count is not precise and/or is corrupted due to unforeseen abnormal terminations or a number of other reasons. In such situations where the resource count is not precise or has been corrupted, the resource count can be recalculated. The resource counting (privileged count) should be fault tolerant (i.e., fuzzy) with a bias towards privileged part of the resource.

Figure 3:
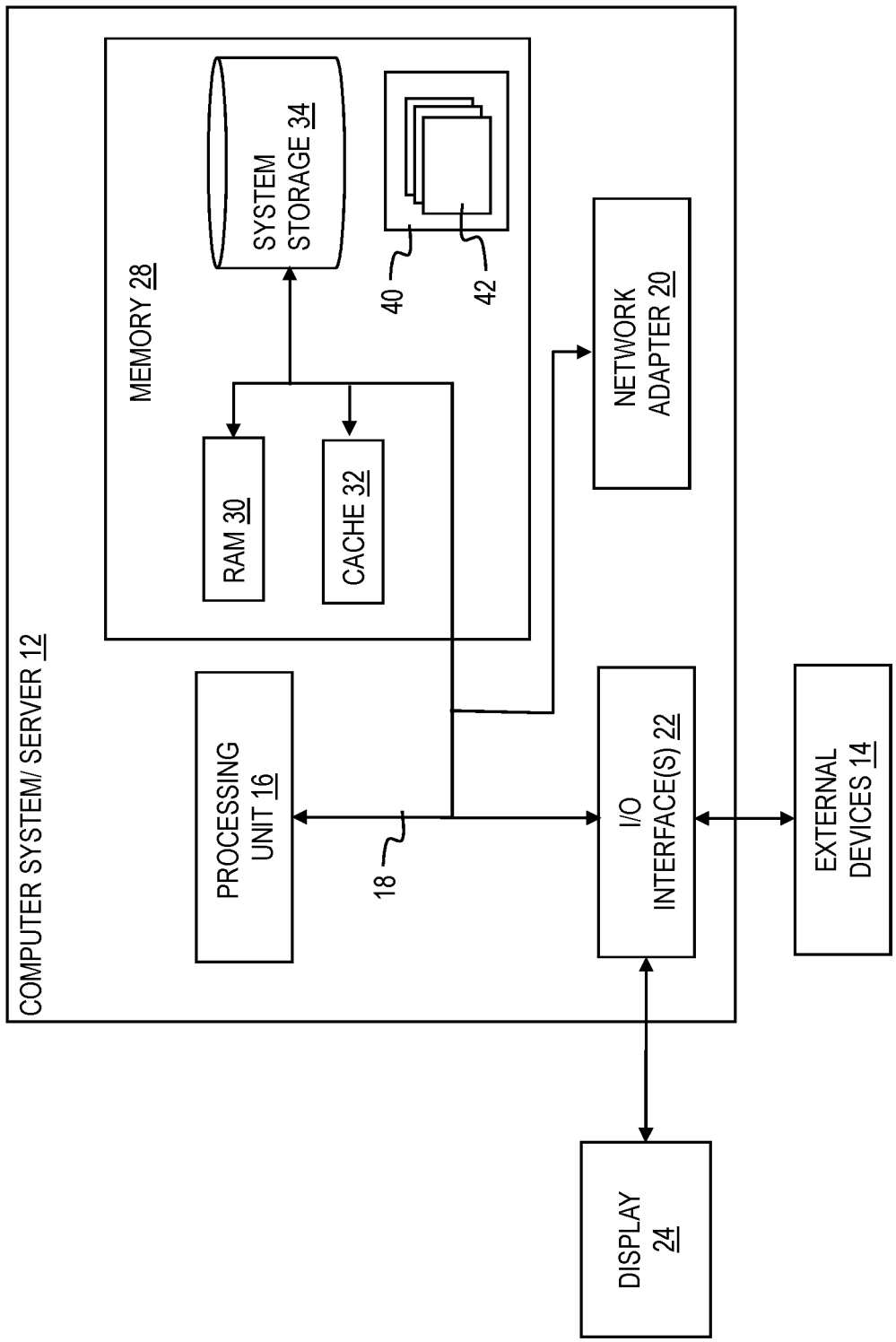
FIG. 3 depicts a schematic of an example of a cloud computing node according to embodiments of the present invention.

Turning now to a more detailed description of aspects of the present invention, FIG. 3 depicts a schematic of an example of a cloud computing node according to embodiments of the present invention. Cloud computing node 10 is only one example of a suitable cloud computing node and is not intended to suggest any limitation as to the scope of use or functionality of the invention described herein.

Regardless, cloud computing node 10 is capable of being implemented and/or performing any of the functionality set forth hereinabove. In cloud computing node 10 there is a computer system/server 12, which is operational with numerous other general purpose or special purpose computing system environments or configurations.

Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media. The system memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. Memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Further, the computer system/server 12 may include, be integrated with, and/or be coupled to elements in hardware and software layer 60, virtualization layer 70, management layer 80, and workloads layer 90.

Figure 4:
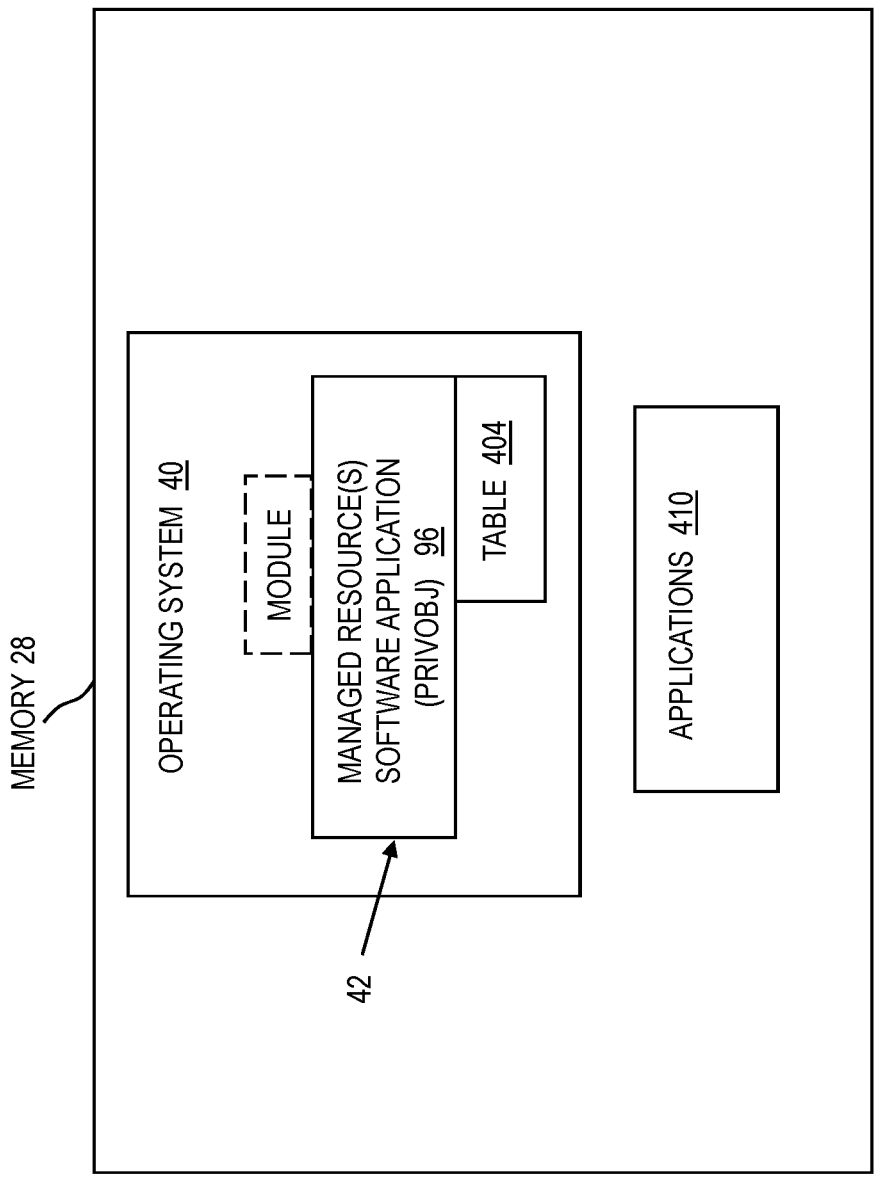
FIG. 4 depicts a simplified view of the memory in computer system/server according to embodiments of the present invention.

FIG. 4 depicts a simplified view of the memory 28 in computer system/server 12 according to embodiments of the present invention. Accordingly, some elements of the memory 28 are not shown so as not to obscure the figure. FIG. 4 shows that one example program module 42 is a managed resource software application 96. The software application 96 is configured to manage resources. Example resources that can be (simultaneously) managed by the software application 96 as countable resources include main storage pages, allocation blocks in a file system, system control structures dedicated to represent a job or task, etc. For explanation purposes, random access memory (such as RAM 30) may be utilized in some example scenarios for ease of understanding and not limitation. FIG. 4 shows an example program/utility 40 which can be an operating system, and various applications 410 can have jobs that need to use the managed resource. A job can be a task that runs on the computer system 12 (or another computer system) and needs to utilize the managed resource to complete execution.

The managed resource software application 96 is configured to reserve a set amount of a resource for privileged users/jobs. In the case of a critical resource shortage, the managed resource software application 96 allows analysis and shortage resolution by the privileged users. The managed resource software application 96 proposed approach can be used for any countable resource in both operating systems and applications, and for an example scenario the countable resource can be random access memory. As noted above, with this design there is no marking or pooling of the resource. This means that units of the resource itself have no indication (marking) that they belong to privileged or non-privileged users. Also, the units of the resource for use by the privileged users are not tracked separately from those for non-privileged users (pooling). Instead, an object of a resource management class (PrivObj) is created to implement special form of resource counting according to this invention. In one implementation, the software application 96 may be representative of the functions of the PrivObj (privileged object) or of the PrivObj itself. This object has an entry in a table 404 for each managed resource and is used for the following. The managed resource software application 96 is configured to manage the managed resource (e.g., RAM 30) such that part of each managed resource is reserved for the privileged jobs by modifying the interpretation of the concept of "free resource". The amount (of the managed resource, e.g., RAM 30) available for non-privileged jobs is total free minus amount set aside for privileged jobs. For the given managed resource (e.g., RAM 30), the managed resource software application 96 keeps track of the number/value of the privileged resource (also referred to as the reserved resource) and the number/value of the unreserved resource. The managed resource is considered as having a reserved/privileged resource part and an unreserved resource part, and each part is a number.

The managed resource software application 96 can include an activation algorithm that is defined to determine if privileged reservation should be activated (or not) and determine the amount of the managed resource reserved for privilege use. This activation algorithm is run at PrivObj creation time and reset time. For example, the managed resource software application 96 is configured to check whether the amount of the resource is too small for efficient management. The managed resource software application 96 determines that the amount of the resource is too small if activation of the privilege protection by the managed resource software application 96 causes an immediate shortage, for example, such that currently running jobs would become stalled. The following is an example process of the activation algorithm. The operating system or application makes a decision whether privilege protection will be activated for a particular resource based on some resource-specific criteria, for example, an Activation number.

X is the Activation number. The number of current free resource must meet or exceed this number (X) for privilege support to be activated for this resource. Typically a small number free would mean no activation since this may cause an immediate shortage. Given a resource, the implementer must decide what this number(X) should be (and/or software application 96 is set in advance with the number X for a predefined resource).

So given a resource, Y=total free resource (number), X=Activation number.

If Y>=X then;

Activate privilege support for this resource;

Else wait some time (several seconds) and try again.

The managed resource software application 96 includes logic to reset the resource counters when a configuration change is detected. The managed resource software application 96 includes resource counters that count the amount of managed resource (which is a countable resource). The resource counters are typically part of the operating system 40, and in one implementation, the software application 96 may include resource counters.

The managed resource software application 96 includes promotion logic which allows non-privileged jobs to consume privileged part of the resource when it advantageous to do so. The non-privileged job is promoted when the software application 96 determines that non-privileged job is exiting the system (e.g., exiting the operating system 40 and/or exiting the managed resource) and will return the needed resource. For example, the managed resource software application 96 can determine that a non-privileged job is in a state of exiting the computer 12 (e.g., exiting the managed resource, such as RAM 30). As one implementation to make this determination, the managed resource software application 96 can be called or invoked by the operating system 40 when the operating system 40 recognizes that the non-privileged job has stalled but has completed a predefined amount of the job (e.g., at least 85%, 90%, 95%, 98% of the job). Additionally, the managed resource software application 96 may check (via the operating system 40) for stalled non-privileged jobs that have completed a predefined amount of the job (e.g., at least 85%, 90%, 95%, 98% of the job).

The managed resource software application 96 includes count management logic, and the count management logic is error tolerant (fuzzy) with a bias always towards the privileged resource.

The managed resource software application 96 is configured to have coexistence with old code levels which do not have support for the privileged resource. The support (for managed resource) can be easily switched off when the system (e.g., computer 12 and/or operating system 40) with an old code level joins a multi-system configuration (cluster) (e.g., other computers 12). This is possible because there is no marking nor pooling with the managed resource software application 96 but only interpretation of resource counters (i.e., utilization of the value) at resource acquirement time.

The following is the definition of PrivObj class which is illustrated by managed resource software application 96. Also, the operations for integrating this privileged support (for preventing and managing a critical resource) to be used with the operating system 40 and/or an application (such as applications 410).

Figure 5:
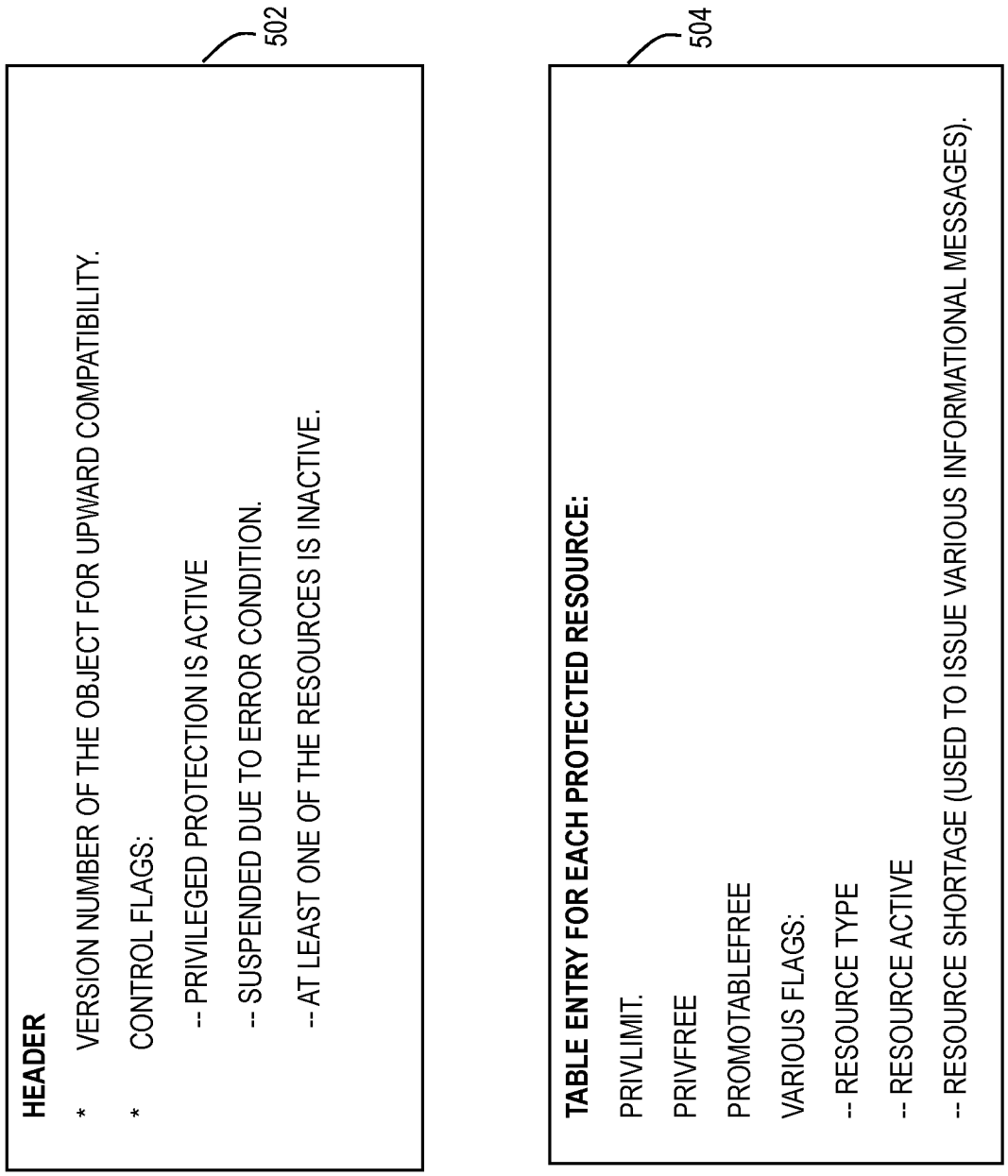
FIG. 5 depicts example contents of a managed resources software application according to embodiments of the present invention.

FIG. 5 depicts example contents of the software application 96 according to embodiments of the present invention. As an example, the PrivObj member data contents (e.g., of the managed resource software application 96) include an example header 502 and a table entry 504 in the table 404. The header 502 can include a version number of the object for upward compatibility and control flags. The control flags can include a privileged protection is active flag, which indicates that the privileged protection is on for the particular managed resource (e.g., RAM). Another resource can have this flag not set, which indicates the privileged protection is not active for that other resource. The control flags can include a flag which indicates suspended due to an error condition, which means that the privileged protection has been stopped. The control flags can include a flag at least one of the resources is inactive, which means that if multiple different resources were previously being managed, at least one of the resources is not currently being managed.

One table entry 504 is illustrated but it should be understood that there is an analogous table entry 504 for each protected/managed resource. Each table entry 504 can include different fields which include PrivLimit, PrivFree, PromotableFree, and various flags/indications.

The PrivLimit is a number (value) of resource originally reserved for privileged users/jobs. Once the PrivLimit is set, this value does not change unless the managed resource is reset or reconfigured. The PrivLimit is a cap to PrivFree.

The PrivFree is a number (value) of the resource currently available for privileged jobs. The PrivFree is reduced while a privileged job/user is using part of the reserved resource in a shortage situation, and is increased when a job/user (privileged or not privileged) finishes using part of the reserved resource. As per above statement, PrivFree is capped by PrivLimit.

As seen in table entry 504, the PromotableFree field is some part of PrivFree which can be handed out to non-privileged jobs when a shortage exists. This part (used as the PromotableFree field) can be a predefined percent of the PrivFree. The promotable resource is only handed out to jobs exiting the system and thereby returning the needed resource. For example, a non-privileged job may require more of the resource (e.g., more megabytes of RAM 30) in the process of exiting the system, and the managed resource software application 96 is configured to promote the non-privileged job to the status of privileged such that the non-privileged job can utilize the reserved resource in order to complete the job to exit the operating system 40 and to free the resource it used.

The various flags in the table entry 504 include the resource type flag, resource active flag, and resource shortage flag (used to issue various informational messages). The resource type field is an indication of the type of resource being managed, such as, e.g., an indication of managing RAM 30. The resource active flag is an indication that management of the particular resource is active. The resource shortage flag is an indication that there is a shortage of the managed resource.

There can be various member functions for the managed resource software application 96. For example, FIG. 6 depicts that the managed resource software application 96 can be and/or include PrivObj member functions 602 according to embodiments of the present invention. The PrivObj member functions 602 (of the software application 96) can include functions/operations such as Create_PRIVOBJ, Return_Privileged_Free, Return_Non_Privileged_ Free, Increment_Privileged_Free_Count, Decrement_Privileged_Free, Return_Resource_Promotable, Reset_Resource(s), and Off_PrivObj. These example functions will be discussed below.

In the managed resource software application 96, Create_PRIVOBJ is a function that is configured to create the object and run a resource algorithm for each managed resource in order to determine if the privileged resource reservation should be activated (or not) for each resource that is to be managed. This activation algorithm interrogates current resource usage and determines if privileged enforcement should be activated. If enforcement would cause immediate shortage, then support will not be activated (i.e., the managed resource software application 96 will not manage this resource), and instead messages and recommendations will be issued. In one implementation, an immediate shortage may be defined as any application (such as one or more applications 410) presently executing on the computer system 12 would immediately stop functioning if the managed support of the software application 96 is initiated because the reserved amount of the managed resource (e.g., RAM 30) could not be reserved without interfering with the present execution of the running application. Also, the resource/activation algorithms of Create_PRIVOBJ are configured to determine the proper value for PrivLimit and PrivFree for each resource. It is noted that this same resource algorithm runs when and if the resource is reset due to a configuration change. PrivFree is typically some small fraction of total free.

In the managed resource software application 96, Return_Privileged_Free is a function that returns the value (which is a number) in the table 404 for PrivFree. For example, for a given resource type, the Return_Privileged_Free function returns the amount reserved (i.e., available) for privileged jobs (PrivFree).

In the managed resource software application 96, Return_Non_Privileged_Free is a function that returns the amount (value) of free resource available for non-privileged jobs. This value is obtained by taking total resource count free minus amount reserved for privileged jobs (PrivFree). This calculation always assures that the reserved amount of the resource is available for privileged users, so that the reserved resource is not allocated (given away) to the non-privileged users.

In the managed resource software application 96, Increment_Privileged_Free_Count (PrivFree) by supplied value is to increment the value of the PrivFree in table 404. When a non-privileged job needs to exit its operations (i.e., exit its use of the managed resource), the managed resource software application 96 is configured to promote the non-privileged job to a privileged job status and then supply the promoted non-privileged job with a supplied value of reserved resource (which could be all or almost all of the reserved resource). The supplied value is the amount of reserved resource given and utilized by a promoted non-privileged job. Accordingly, the Increment_Privileged_Free__Count is a function configured to add the previously supplied value back to PrivFree such that return of the supplied value can be accounted for. It is noted that the PrivFree can never exceed the limit (i.e., PrivLimit) established at creation or reset time. A particular concept is that when a job (privileged job and/or non-privileged job) returns any amount of resource, the privileged part of the resource is always replenished first. This is true regardless of the privileged state of the job returning the resource. This bias towards privileged facilitates availability of the privileged resource. For example, when promoted non-privileged job returns a resource, the software application 96 will replenish the privileged part of the resource first.

In the managed resource software application 96, the Decrement_Privileged_Free is a function configured to decrement the privileged free (PrivFree) count by the supplied value, when the supplied value of the reserved/privileged resource is being given (i.e., supplied) to the privileged job or the recently promoted non-privileged job (i.e., now with a privileged status). It is noted that if the decrement (of the privileged free (PrivFree) count for the reserved amount of the resource) will cause the value to be less than zero, then set PrivFree to zero. In other words, PrivFree can never be negative number because the amount of resource is not a negative value.

In the managed resource software application 96, the Return_Resource_Promotable function is configured to, for a given resource, return Boolean (e.g., true or false) denoting whether non-privileged job is promotable or not. An example of when the non-privileged job is not promotable is when this job is not exiting the system and therefore is not eligible to be promoted. In the managed resource software application 96, Reset_Resource(s) (all or a list of resources) is a function configured to, given a specific resource or indication of all resources, reset the resource(s). Resetting the resource involves re-running the same resource activation algorithm used at creation time to recalculate values of for the PrivLimit and PrivFree.

In the managed resource software application 96, Off_P-RIVOBJ is a function configured to turn off privileged support altogether.

The following is a scenario using RAM 30 as the managed resource being managed by the managed resource software application 96. Accordingly, given the privileged support discussed herein example, operations integrating the privileged resource protection mechanism within a system (e.g., operating system 40) and/or application are depicted in a flow chart 700 in FIGS. 7A, 7B, and 7C.

At block 702, the code developer (or operator) needs to identify the resource(s) to protect and to design the activation algorithm(s) for each resource (for PRIVOBJ::Create). The activation algorithm determines if the current resource configuration (prior to privilege protection action) will support privileged protection. In the example, the managed resource software application 96 will provide privileged protection for RAM 30, along with other resources such as disk storage 34, etc. If privileged protection is to be activated, the managed resource software application 96 is configured to then set PrivLimit and PrivFree values. These values are dependent on the total count of available resource and the current free count for the resource. For example, it may be assumed that the RAM 30 is 1 gigabyte (GB) (which is a countable resource). In one implementation, the managed resource software application 96 is configured to reserve 10% of the managed resource, which means that the value of the PrivLimit is set to 100 megabytes (MB) of RAM 30, and the PrivFree is initially set to 100 MB, although PrivFree changes as the privileged resource is allocated and returned from privileged users/jobs.

At block 704, the code developer needs to identify code paths in a system (e.g., operating system 40) or application code where the resource (e.g., RAM 30) is acquired. A call to the appropriate method of the managed resource software application 96 will need to be inserted at each code path identified in this way, before the resource can be actually allocated to the requestor. This call to the managed resource software application 96 will decide whether resource allocation is permitted based on the current state of the caller (privileged vs non-privileged) and the state of the managed resource. In one implementation, the managed resource software application 96 can deploy a module (or script, plug-in, application program interface (API) etc.) to the operating system 40 such that the operating system 40 seamlessly integrates and/or calls the managed resource software application 96 before allocating the managed resource (RAM 30) and when any amount of the managed resource is being returned. As an illustrative view, FIG. 8 depicts a high-level diagram of the managed resource software application 96 individually providing privileged protection for various managed resources (including RAM 30 as one of the managed resources) according to embodiments of the present invention.

At block 706, the managed resource software application 96 is configured to check for job privileged state (or not privileged state) for a job requesting use or allocation of the managed resource. The managed resource software application 96 can add a check for job privileged state to the operating system 40 such that the managed resource software application 96 is called/invoked by the operating system 40 to check whether the job requesting the managed resource is a privileged job or a non-privileged job. The managed resource software application 96 recognizes if a job is a privileged job or a non-privileged job by checking the table 404 because privileged jobs are predefined in advance.

At block 708, if the job is not privileged, then the managed resource software application 96 invokes Return_Non_Privileged_Free to determine if free resource exists for the managed resource. If the free resource exists, managed resource software application 96 permits the non-privileged job to consume the managed resource and continue at block 710. The managed resource software application 96 could instruct the operating system 40 to permit the non-privileged job to consume the free portion of the managed resource (e.g., RAM 30). The free portion of the managed resource does not include the reserved amount of the managed resource, which was 100 MB of RAM 30 in the example scenario.

At block 712, if the job is not privileged and if there is no free resource available of the managed resource, the managed resource software application 96 is configured to determine if the exiting job may be temporarily promoted by invoking Return_Resource_Promotable. If the non-privileged job is not promotable (because job is not exiting the operating system), the managed resource software application 96 is configured to run code which handles "out of resource" condition at block 714. One skilled in the art understands code handling an out of resource condition is designed to close, suspend, stop, purge, and/or abort the current job that is out of the resource. The software application 96 and/or the operating system 40 can have the code to stop the current job that is out of the available managed resource, and the code closing the job can utilize the reserved amount (e.g., a portion of the reserved amount) of the managed resource in order to close the job.

At block 716, if the managed resource software application 96 determines that non-privileged job is promotable to privileged status because the job is exiting the operating system, the managed resource software application 96 is configured to promote the job and supply the job with the requested resource needed to exit. Also, the managed resource software application 96 invokes Decrement_Privileged_Free in order to reduce the value of PrivFree by the supplied value of the reserved resource given to the non-privileged job that was just promoted.

At block 718, if the job is privileged, the managed resource software application 96 is configured to invoke Return_Privileged_Free to determine the value of the reserved resource that is actually free, and this value is PrivFree in the table 404. At block 720, if the value of the available reserved resource (PrivFree) is greater than or equal to the amount requested by the privileged job, the managed resource software application 96 is configured to supply the requested amount of the reserved resource to the privileged resource (i.e., allocate the resource to the job). Additionally, the managed resource software application 96 is configured to invoke Decrement_Privileged_Free by the amount of the supplied value of the resource.

At block 722, if no privileged/reserved resource is available, then the managed resource software application 96 is configured to run code which handles "out of resource" condition.

At block 724, the code developer needs to identify code paths in a system (e.g., operating system 40) or application code where the resource (previously used by a job (privileged or non-privileged)) is returned and to invoke Increment_Privileged_Free_Count (i.e., increment PrivFree) for the resource being returned regardless of the job's privileged status. Code path identification requires a knowledge of the relevant operating system or application code. It should be appreciated that code path identification is a one-time action to find and change the code and it is a job for a software developer. This bias towards privileged should always assure privileged resource availability when needed. Also, this bias to privileged allows promoted jobs to replenish the privileged resource. It is noted that resource management counters may be inaccurate (fuzzy), but will always bias towards privileged. Also, PrivFree is designed to never exceed PrivLimit even when the value of PrivFree is being incremented as jobs return their use (amount) of the managed resource because PrivFree is capped at the value of PrivLimit.

At block 726, the code developer needs to identify code paths where the total resource counters are increased and/or decreased in the operating system 40. An increase or decrease of resource counters of the managed resource typically occurs because of a configuration change. For example, assume that more of the managed resource has just been installed (e.g., more RAM installed), and this results in an increase in the total amount of the resource. At these locations, the code path will need to be changed to invoke the Reset_Resource method of the managed resource software application 96. Just as discussed above at the PrivObj creation time, the activation algorithm of the managed resource software application 96 will be re-run and will determine if privileged protection is warranted and should be activated. If the privileged protection should be activated, the managed resource software application 96 will set PrivLimit and PrivFree to proper values.

At block 728, when a system (another/different operating system) with a down level code joins the configuration (with the operating system 40) and the down level code does not have support for privileged resources, the managed resource software application 96 is configured to invoke Off_PRIVOBJ. This is the only action needed. As such, there is no requirement for un-marking the privileged resource since the actual resource was never marked nor pooled. The code in the up-level release Off_PRIVOBJ (of the software application 96) does not need to know if support was activated or not. The code in PrivObj method (of software application 96) encapsulates all the support required whether resource reservation was activated or not. Each method will return correct information regardless if support is on or off. For example when off, Return_Non_Privileged_Free would just return total free and not subtract PrivFree since PrivFree is no longer pertinent. It is noted that there may be privileged jobs currently active when the down-level system joins, but these privileged jobs currently active are marked in a manner that does not affect down level code. Returning privileged resource turns into a no-op.

It should be recognized that the methods of the software application 96 are not limited to the type of resource being managed, as long as the managed resource is countable. This makes methods discussed herein extendable to other operating systems and applications.

FIG. 9 is a flow chart 900 of a computer-implemented method for resource allocation of a managed resource (such as RAM 30, system storage 34, etc.) according to embodiments of the present invention. The embodiments are executed by processing circuitry, e.g., processing units, of the multiprocessor computer system 12. The managed resource software application 96 is configured to individually manage multiple resources simultaneously and execute the flow in FIG. 9. It should be appreciated that embodiments of the invention apply to any resource managed by a computer system (either by the operating system or by an application).

At block 902, the software application 96 of computer system 12 is configured to (initially) set a reserved amount (e.g., PrivLimit) of the managed resource (e.g., RAM 30) to be available for a privileged status (i.e., privileged jobs), such that there is an unreserved amount (non-privileged free value) of the managed resource.

At block 904, in response to a non-privileged job needing more of the unreserved amount of the managed resource than what is available, the software application 96 of computer system 12 is configured to determine whether the non-privileged job is promotable to a privileged status (i.e., whether the non-privileged job should be promoted to a privileged job).

At block 906, in response to the non-privileged job not being promotable to the privileged status, the software application 96 of computer system 12 is configured to prevent the non-privileged job from accessing the reserved amount of the managed resource.

At block 908, in response to the non-privileged job being promotable to the privileged status (i.e., promoted to privileged job), the software application 96 of computer system 12 is configured to permit the non-privileged job to utilize the reserved amount of the managed resource (as though it is a privileged job).

The managed resource is a countable item, such that the managed resource has a total value (and/or approximated/estimated total value) which can be identified. The reserved amount is a value (e.g., PrivLimit in the table 404) denoting how much of the total value is to be available for the jobs with privileged status. As an example, the PrivLimit can be 100 MB (and/or a predefined value) of RAM 30 when the total value of RAM 30 is 1 GB.

The reserved amount is a percentage of the total value of the managed resource. For example, the reserved amount can be set as 10% of the total value of the managed resource, and can be 100 MB if the total value is 1 GB. The unreserved amount can be 900 MB (or (90%) of the total value 1 GB).

In response to the non-privileged job needing more of the unreserved amount of the managed resource than what is (currently) available (assume that only 500 MB of the unreserved amount is available because the other 400 MB is used by one or more other non-privileged jobs), the software application 96 is configured to determine whether the non-privileged job is promotable to the privileged status which comprises: determining that the non-privileged job is stalled because more (e.g., the non-privileged job needs 50 MB more of the managed resource RAM 30) of the unreserved amount of the managed resource is not available (i.e., the software application 96 can receive a trigger from the operating system 40 that the non-privileged job is stalled and/or running so slowly that it is considered stalled), determining that the non-privileged job is in a stage of exiting use of the unreserved amount of the managed resource, and determining that the non-privileged job is promotable to the privileged status because the non-privileged is in the stage of exiting, thereby promoting the non-privileged job to the privileged status such that the reserved amount of the managed resource is useable by the non-privileged job. The software application 96 can communicate with the operating system 40 to recognize that the non-privileged job is in the stage of exiting the managed resource because the non-privileged job is executing code (and/or attempting to execute code) indicative of exiting, is over a predefined percentage/amount complete, etc. Also, the software application 96 can be triggered by the operating system 40 that the non-privileged job is in the stage of exiting the managed resource (RAM 30) and/or operating system.

The reserved amount is a limit value (PrivLimit) that denotes a number of the managed resource originally reserved for the privileged status, and the limit value is not to be exceeded. A free value (PrivFree) is a number of the reserved amount currently available for the privileged status (the free portion of the PrivLimit that is not being utilized and available for use by privileged job and/or promoted non-privileged jobs), such that the free value originally equals the limit value of the reserved amount. In one implementation, the free value must be maintained at and/or not go above a predefined value/percentage of the PrivLimit. Continuing the previous scenario for RAM 30, if the PrivLimit is 100 MB then PrivFree is not allowed to exceed 100 MB. PrivFree is decremented when there is a resource shortage, and privileged jobs are allowed to consume the reserved portion of the resource. The PrivFree can reach 0 MB but not a negative number. Promoted non-privileged jobs can cause PrivFree to be decreased, but typically promoted jobs are not allowed to completely deplete PrivFree. For example, non-privileged jobs will not be allowed to be promoted when PrivFree falls below 10 MB.

Each time the reserved amount is given at a supplied value (whatever is to be utilized) for use by any given job at the privileged status, the free value (PrivFree) is reduced by the supplied value, and the any given job comprises a selection from the group consisting of the non-privileged job at the privileged status and/or a privileged job. Each time the any given job at the privileged status has completed using the reserved amount, the free value is increased by the supplied value up to the limit value (PrivLimit). Each time a given non-privileged job has completed using the unreserved amount, the free value (PrivFree) is also increased by a corresponding value that has been relinquished by the given non-privileged job up to the limit value (PrivLimit).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for resource allocation of a managed resource, the method comprising:

setting, by a computer, a reserved amount of the managed resource to be available for a privileged status, such that there is an unreserved amount of the managed resource to be available for a non-privileged status;

in response to a non-privileged job needing more of the unreserved amount of the managed resource than what is available, determining whether the non-privileged job is promotable to the privileged status;

in response to the non-privileged job not being promotable to the privileged status, preventing the non-privileged job from accessing the reserved amount of the managed resource; and in response to the non-privileged job being promotable to the privileged status, permitting the non-privileged job to utilize the reserved amount of the managed resource, wherein in response to the non-privileged job needing more of the unreserved amount of the managed resource than what is available, determining whether the non-privileged job is promotable to the privileged status comprises:

- determining whether the non-privileged job is stalled because more of the unreserved amount of the managed resource is not available;
- determining whether the non-privileged job is in a stage of exiting use of the unreserved amount of the managed resource; and
- determining whether the non-privileged job is promotable to the privileged status because the non-privileged job is in the stage of exiting, thereby promoting the non-privileged job to the privileged status such that the reserved amount of the managed resource is useable by the non-privileged job.

2. The computer-implemented method of claim 1, wherein the managed resource is a countable item, such that the managed resource has a total value.

3. The computer-implemented method of claim 2, wherein the reserved amount is a value denoting how much of the total value is to be available for the privileged status.

4. The computer-implemented method of claim 2, wherein the reserved amount is a percentage of the total value of the managed resource.

5. The computer-implemented method of claim 1, wherein the reserved amount is a limit value that denotes an amount of the managed resource originally reserved for the privileged status; and wherein a free value is a portion of the reserved amount currently available for the privileged status, such that the free value originally equals the limit value of the reserved amount.

6. The computer-implemented method of claim 5, wherein, each time the reserved amount is given at a supplied value for use by a given job at the privileged status, the free value is reduced by the supplied value, the given job comprising a selection from the group consisting of a non-privileged job at the privileged status and a privileged job; and wherein, each time the given job at the privileged status has completed using the reserved amount, the free value is increased by the supplied value up to the limit value.

7. The computer-implemented method of claim 6, wherein, each time a given non-privileged job has completed using the unreserved amount, the free value is increased by a corresponding value that has been relinquished by the given non-privileged job up to the limit value.

* * * * *